(12) United States Patent
Chen

(10) Patent No.: US 11,140,249 B2
(45) Date of Patent: Oct. 5, 2021

(54) TRANSMISSION MODULE, TRANSMISSION MECHANISM, AND MOBILE TERMINAL

(71) Applicant: GUANGDONG OPPO MOBILE TELECOMMUNICATIONS CORP., LTD., Guangdong (CN)

(72) Inventor: Jia Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 135 days.

(21) Appl. No.: 16/698,660

(22) Filed: Nov. 27, 2019

(65) Prior Publication Data

US 2020/0177715 A1    Jun. 4, 2020

(30) Foreign Application Priority Data

Nov. 30, 2018  (CN) .......................... 201822012084.7

(51) Int. Cl.
  *H04N 5/225*   (2006.01)
  *H04M 1/02*   (2006.01)
  (Continued)

(52) U.S. Cl.
  CPC ........ *H04M 1/0264* (2013.01); *F16M 11/105* (2013.01); *H04N 5/2252* (2013.01); *H04N 5/2257* (2013.01)

(58) Field of Classification Search
  None
  See application file for complete search history.

(56) References Cited

U.S. PATENT DOCUMENTS 7,782,375 B2 * 8/2010 Chambers ............ H04N 5/2251
                                                                    348/239
9,288,471 B1 * 3/2016 Yang ....................... G06F 3/017
(Continued)

FOREIGN PATENT DOCUMENTS

CN       204216938 U      3/2015
CN       107197133 A      9/2017
(Continued)

OTHER PUBLICATIONS

The first examination report for the India family application No. 201914048159, dated Mar. 15, 2021.
(Continued)

*Primary Examiner* — Tuan A Tran

(57) ABSTRACT

Some embodiments of the present disclosure provide a transmission module, a transmission mechanism, and a mobile terminal. The mobile terminal includes a terminal device, a driving mechanism, a transmission assembly and a mounting seat. The terminal device includes a front face, a rear face and a side peripheral face, and the terminal device defines a mounting groove. The driving mechanism is coupled to the terminal device. The transmission assembly includes a first pushing member and a second pushing member coupled to the first pushing member, and the first pushing member is coupled to the driving mechanism. The mounting seat is coupled to the first pushing member and the second pushing member, and the mounting seat is provided with a camera module. The driving mechanism enables the first pushing member to move from a first position to a third position via a second position.

20 Claims, 12 Drawing Sheets

(51) Int. Cl.
*H04W 88/02* (2009.01)
*G06F 1/16* (2006.01)
*F16M 11/10* (2006.01)

(56) References Cited

U.S. PATENT DOCUMENTS

| | | | | |
|---|---|---|---|---|
| 9,467,540 | B2* | 10/2016 | Feng | H04M 1/0264 |
| 9,686,456 | B2* | 6/2017 | Wu | H04N 5/2257 |
| 9,762,781 | B2* | 9/2017 | Evans, V | H04N 5/2254 |
| 9,998,642 | B2* | 6/2018 | Evans, V | H04N 5/2254 |
| 10,021,296 | B2* | 7/2018 | Fan | H04N 5/2251 |
| 10,070,030 | B2* | 9/2018 | Evans, V | G02B 13/0065 |
| 10,284,697 | B2* | 5/2019 | Yin | H04M 1/0264 |
| 10,306,033 | B1* | 5/2019 | Cheng | H04M 1/0266 |
| 10,444,802 | B2* | 10/2019 | Zeng | H04M 1/0235 |
| 10,567,558 | B2* | 2/2020 | Xu | H04M 1/0264 |
| 10,601,966 | B2* | 3/2020 | Fan | H04M 1/0264 |
| 10,637,974 | B2* | 4/2020 | Zeng | G06F 1/1626 |
| 10,637,978 | B2* | 4/2020 | Fan | H04M 1/0266 |
| 10,656,680 | B2* | 5/2020 | Fan | G06F 1/1647 |
| 10,698,454 | B2* | 6/2020 | Zeng | G06F 1/188 |
| 10,887,436 | B2* | 1/2021 | Zeng | H04N 5/2253 |
| 2008/0002965 | A1* | 1/2008 | Huang | G03B 17/04 396/419 |
| 2017/0064166 | A1* | 3/2017 | Xiong | H04M 1/0264 |
| 2018/0248987 | A1 | 8/2018 | Cha et al. | |
| 2019/0033926 | A1* | 1/2019 | Huang | H04M 1/0264 |
| 2019/0253533 | A1* | 8/2019 | Fan | H04M 1/0264 |
| 2019/0253534 | A1* | 8/2019 | Fan | H04M 1/0266 |

FOREIGN PATENT DOCUMENTS

| | | |
|---|---|---|
| CN | 107872609 A | 4/2018 |
| CN | 107888809 A | 4/2018 |
| CN | 107911579 A | 4/2018 |
| CN | 207802113 U | 8/2018 |
| CN | 207926665 U | 9/2018 |
| CN | 207968579 U | 10/2018 |
| CN | 209572070 U | 11/2019 |
| EP | 3396933 A1 | 10/2018 |
| EP | 3525428 A1 | 8/2019 |

OTHER PUBLICATIONS

The extended European search report for the EP patent application No. 19212532.6, dated Apr. 30, 2020.

International Application No. PCT/CN2019/116695, International Search Report, dated Feb. 3, 2020, 10 pages.

* cited by examiner

TRANSMISSION MODULE, TRANSMISSION MECHANISM, AND MOBILE TERMINAL

CROSS-REFERENCE TO RELATED APPLICATION(S)

The present disclosure claims priority to Chinese Patent Application No. 201822012084.7, filed on Nov. 30, 2018 and entitled "Transmission Module, Transmission Mechanism, Camera Assembly and Mobile Terminal", the contents of which are hereby incorporated by reference in its entirety.

TECHNICAL FIELD

The present disclosure relates to a technical field of mobile terminals.

BACKGROUND

For increasing a screen-to-body ratio of a mobile terminal such as a mobile phone, a general solution is to arrange a telescopic camera in a mobile terminal, and a shooting scenario of the telescopic camera is relatively undiversified.

SUMMARY

In an aspect of the present disclosure, a mobile terminal is provided, which includes:

a terminal device including a front face, a rear face opposite the front face, and a side peripheral face coupled between the front face and the rear face, wherein the terminal device defines a mounting groove through the side peripheral face;

a driving mechanism coupled to the terminal device;

a transmission assembly comprising a first pushing member and a second pushing member coupled to the first pushing member, wherein the first pushing member is coupled to the driving mechanism; and a mounting seat coupled to the first pushing member and the second pushing member, wherein the mounting seat is provided with a camera module; the driving mechanism enables the first pushing member to move from a first position to a third position via a second position; at the first position, the mounting groove accommodates the camera module; at the second position and the third position, the camera module exposes from the terminal device; between the first position and the second position, the first pushing member enables the second pushing member and the mounting seat to move; between the second position and the third position, the driving mechanism enables the first pushing mechanism to move relative to the second pushing member, and the first pushing member enables the mounting seat to rotate to change an orientation of an incident face of the camera module.

In another aspect of the present disclosure, a mobile terminal is provided, which includes a mounting seat, a driving member, a first pushing member and a second pushing member, wherein the first pushing member and the second pushing member are correspondingly coupled to the mounting seat; a cooperation between the driving member and the first pushing member enables the second pushing member to move and drive the first pushing member to move from a first position to a third position via a second position; between the first position and the second position, the first pushing member enables the second pushing member and the mounting seat to move; between the second position and the third position, the first pushing member is movable relative to the second pushing member and enables the mounting seat to rotate; a rotating axis of the mounting seat is perpendicular to a movement direction of the first pushing member.

In an additional aspect of the present disclosure, a transmission mechanism is provided, which includes a motor and a transmission module, wherein the transmission module includes a mounting seat, a driving member, a first pushing member and a second pushing member; the first pushing member and the second pushing member are correspondingly coupled to the mounting seat; a cooperation between the driving member and the first pushing member enables the second pushing member to move and drive the first pushing member to move from a first position to a third position via a second position; between the first position and the second position, the first pushing member enables the second pushing member and the mounting seat to move; between the second position and the third position, the first pushing member is movable relative to the second pushing member and enables the mounting seat to rotate; a rotating axis of the mounting seat is perpendicular to a movement direction of the first pushing member; an output end of the motor is coupled to the driving member, and the motor enables the driving member to rotate.

BRIEF DESCRIPTION OF THE DRAWINGS

In order to describe the technical solutions in embodiments of the disclosure or a conventional art more clearly, the drawings required to be used for descriptions about the embodiments or the prior art will be simply introduced below. It is apparent that the drawings described below are only some embodiments of the disclosure. Those of ordinary skill in the art may further obtain other drawings according to these drawings without creative work.

DETAILED DESCRIPTION OF THE EMBODIMENT

Figure 1:
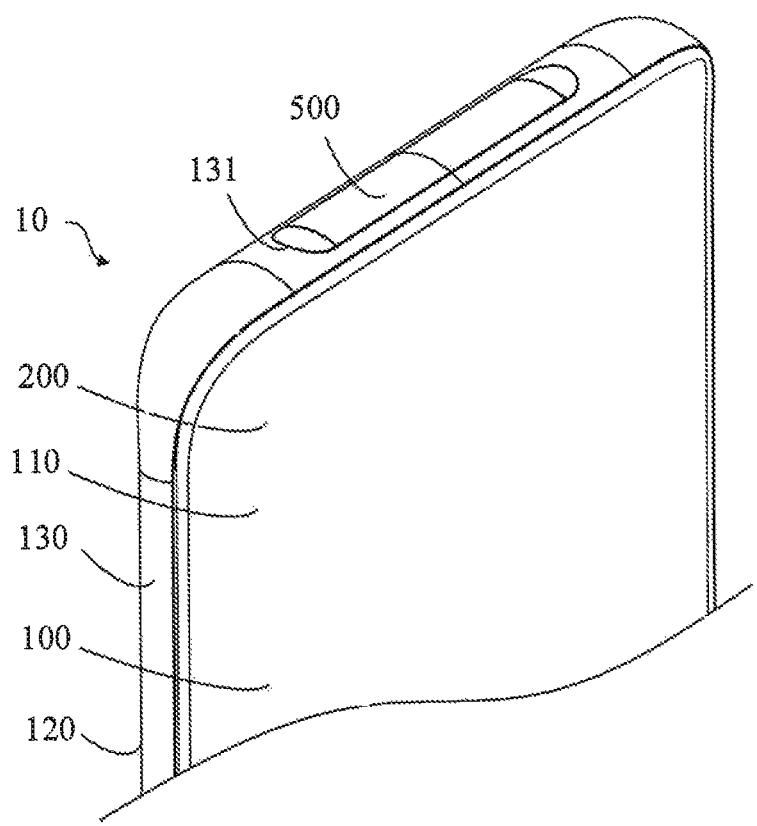
FIG. 1 is a solid diagram when a first pushing member of a mobile terminal according to an embodiment is at a first position from a viewing angle.

For conveniently understanding the disclosure, the disclosure will be described below more comprehensively with reference to related drawings. The preferred embodiments of the disclosure are shown in the drawings. However, the disclosure may be implemented in many different forms and is not limited to the embodiments described herein. Instead, these embodiments are provided to make the contents disclosed in the disclosure more thoroughly and comprehensively.

"Terminal device" used here includes, but not limited to, a device connected in any one or more of the following connection manners and capable of receiving and/or sending a communication signal:

(1) a wired connection manner, for example, a Public Switched Telephone Network (PSTN), a Digital Subscriber Line (DSL), a digital cable and direct cable connection; and (2) a wireless interface manner, for example, a cellular network, a Wireless Local Area Network (WLAN), a digital television network like a Digital Video Broadcasting Handheld (DVB-H) network, a satellite network and an Amplitude Modulation (AM)-Frequency Modulation (FM) broadcast transmitter.

A terminal device configured to communicate through a wireless interface may be called a "mobile terminal". Examples of the mobile terminal include, but not limited to, the following electronic devices:

(1) a satellite phone or a cell phone;

(2) a Personal Communication System (PCS) terminal capable of integrating a cellular radio phone and data processing, faxing and data communication capabilities;

(3) a radio phone, a pager, Internet/intranet access, a Web browser, a memo pad, a calendar and a Personal Digital Assistant (PDA) equipped with a Global Positioning System (GPS) receiver;

(4) a conventional laptop and/or palmtop receiver; and (5) a conventional laptop and/or palmtop radio phone transceiver and the like.

Figure 2:
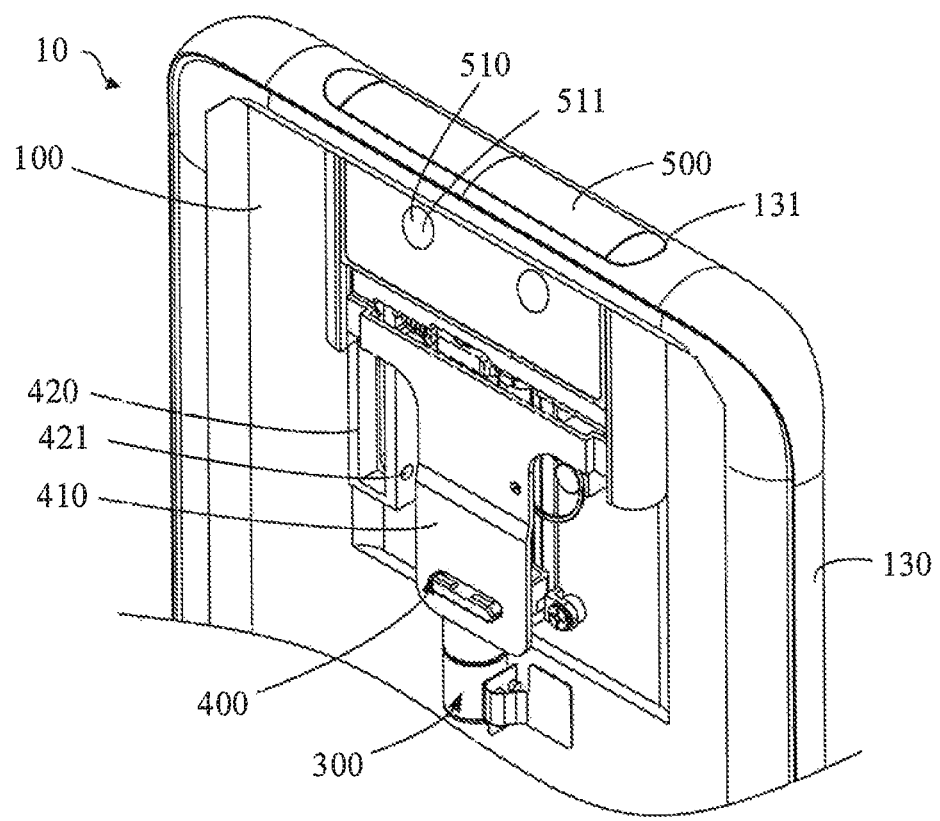
FIG. 2 is a solid diagram when the first pushing member of the mobile terminal shown in FIG. 1 is at the first position from another viewing angle.

Referring to FIG. 1 and FIG. 2, in an embodiment, a mobile terminal 10 is a smart phone. The mobile terminal 10 includes a terminal device 100, and the terminal device 100 is substantially shaped into a rectangular block, and includes a front surface 110, a rear face 120 opposite the front face 110, and a side peripheral face 130 surrounding the first face 110 and the rear face 120. Also referring to FIG. 3, the mobile terminal 10 includes a display screen 200, a display region of the display screen 200 faces a side where the front face 110 is positioned, and the display screen 200 is configured to display information and provide an interaction interface for a user. The mobile terminal 10 may include a glass cover plate, the glass cover plate is arranged on one side of the display region of the display screen 200 in a covering manner, and an outer face of the glass cover plate forms all or part of the front face 110. The mobile terminal 10 may include a battery cover, the battery cover is positioned on a side back on to the front face 110, the rear face 120 is positioned on the battery cover, and a hollow mounting space is formed between the battery cover and the display screen 200, so as to mount electronic components of the mobile terminal 10, such as a battery and a circuit board. In other implementation modes, the mobile terminal 10 may be a pad and the like.

Figure 3:
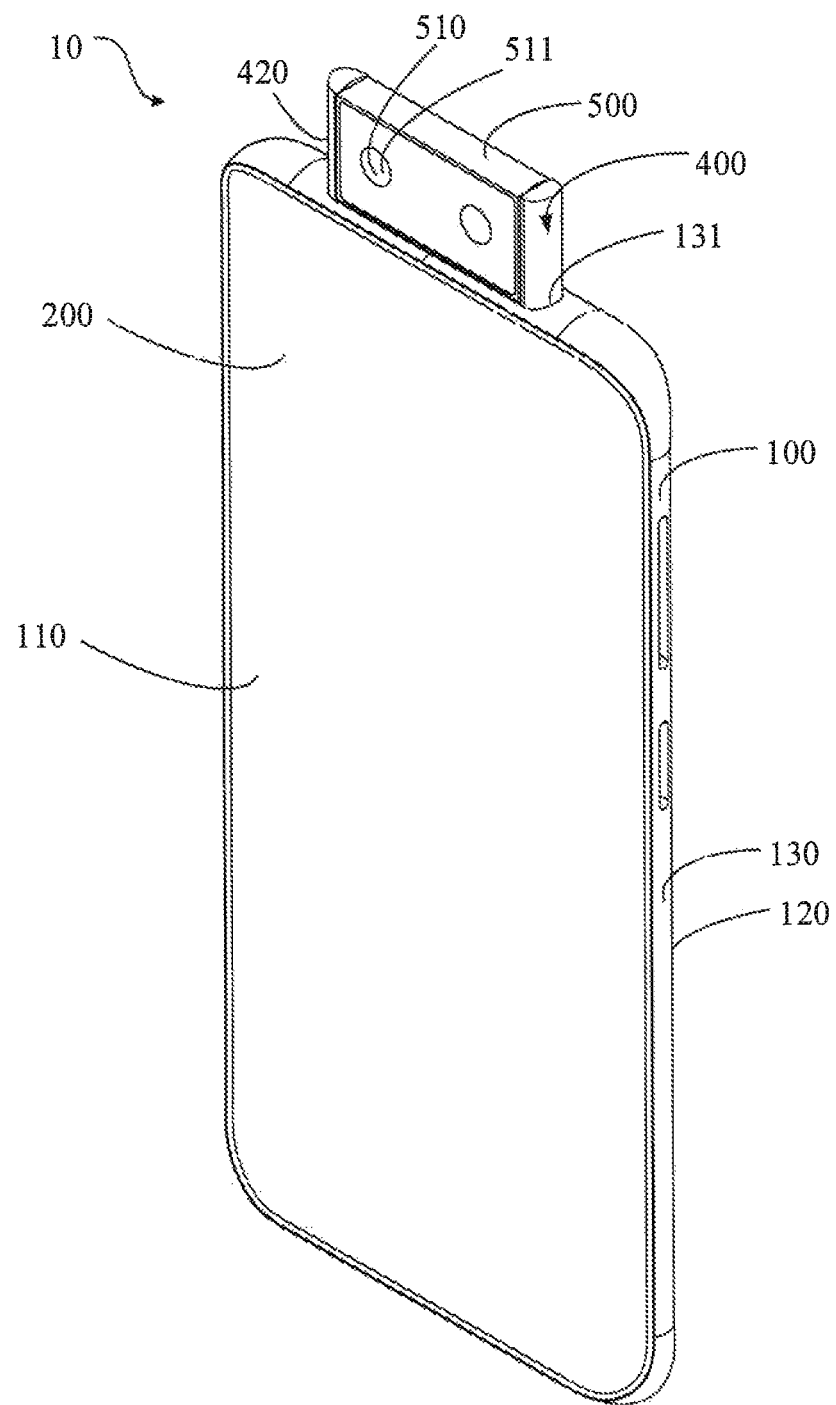
FIG. 3 is a solid diagram when the first pushing member of the mobile terminal shown in FIG. 1 is at a third position from a viewing angle.
Figure 4:
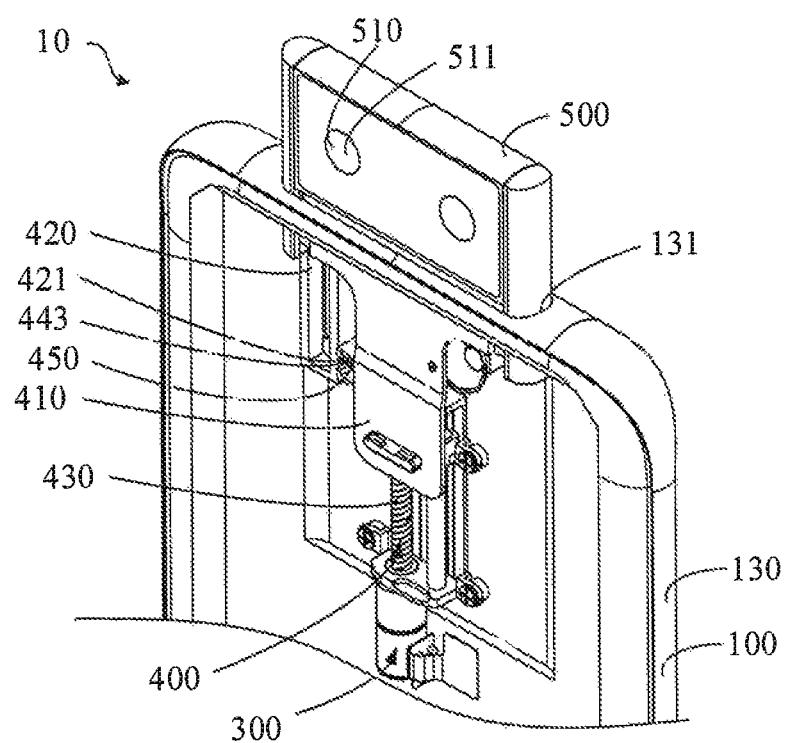
FIG. 4 is a solid diagram when the first pushing member of the mobile terminal shown in FIG. 1 is at a second position.
Figure 5:
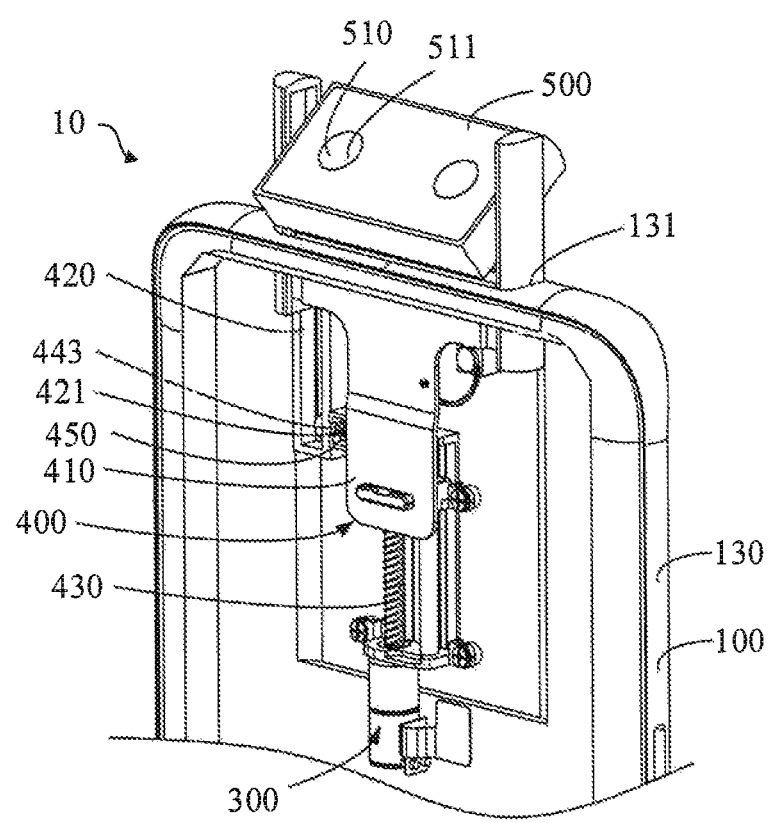
FIG. 5 is a solid diagram when the first pushing member of the mobile terminal shown in FIG. 4 is at a certain position between the second position and the third position.

Referring to FIG. 1, FIG. 2 and FIG. 3, the terminal device 100 defines a mounting groove 131 through the side peripheral face 130, the mobile terminal 10 includes a camera assembly, the camera assembly includes a transmission mechanism and a camera module 510, and the transmission mechanism includes a driving mechanism 300, a transmission assembly 400 and a mounting seat 500. The driving mechanism 300 is coupled to the terminal device 100, the transmission assembly 400 includes a first pushing member 410 and a second pushing member 420 coupled to the first pushing member 410, and the first pushing member 410 is connected with the driving mechanism 300. The mounting seat 500 is used to connect the first pushing member 410 and the second pushing member 420, the mounting seat 500 is provided with the camera module 510, the camera module 510 includes an incident face 511, and ambient light is transmitted through the incident face 511 and incident to a photosensitive element of the camera module 510. The driving mechanism 300 enables the first pushing member 410 to move from a first position to a third position via a second position. Referring to FIG. 1 and FIG. 2, at the first position, the mounting groove 131 accommodates the camera module 510. Referring to FIG. 3 and FIG. 4, at the second position and the third position, the camera module 510 exposes from the terminal device 100. Referring to FIG. 5, between the second position and the third position, the driving mechanism 300 enables the first pushing member 410 to move relative to the second pushing member 420, and the first pushing member 410 enables the mounting seat 500 to rotate, so as to change an orientation of the incident face 511 of the camera module 510.

In an exemplary embodiment, a rotating axis of the mounting seat 500 is perpendicular to a movement direction of the first pushing member 410. In an embodiment, the first position, the second position and the third position are sequentially arranged along a length direction of the mobile terminal 10, and the rotating axis of the mounting seat 500 extends along a width direction of the mobile terminal 10. In other implementation modes, the first position, the second position and the third position may also be sequentially arranged along the width direction of the mobile terminal 10, and the rotating axis of the mounting seat 500 extends along the length direction of the mobile terminal 10. In other implementation modes, the first position, the second position and the third position may also be arranged along another direction, for example, a diagonal extension direction of the mobile terminal 10.

Referring to FIG. 4, in an embodiment, at the second position, the orientation of the incident face 511 is opposite an orientation of the display screen 200, and the camera module 510 may realize a function of a rear camera, for example, the user may execute operations of long shot photographing, video recording and the like by the camera module 510. Referring to FIG. 3, at the third position, the orientation of the incident face 511 is as same as the orientation of the display screen 200, and the camera module 510 may realize a function of a front camera, for example, the user may execute operations of self-timing, video call making and the like by the camera module 510. In another embodiment, at the second position, the orientation of the incident face 511 is as same as the orientation of the display screen 200, and the camera module 510 may realize the function of the front camera; and at the third position, the orientation of the incident face 511 is opposite the orientation of the display screen 200, and the camera module 510 may realize the function of the rear camera. Elaborations are omitted here.

Figure 6:
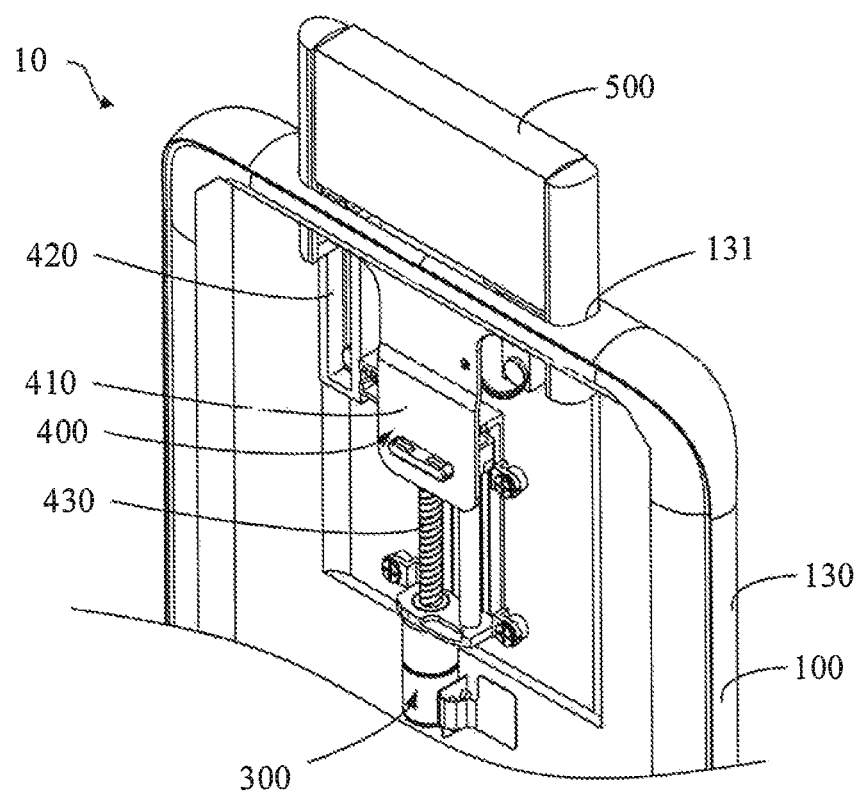
FIG. 6 is a solid diagram when the first pushing member in the mobile terminal shown in FIG. 3 is at the third position from another viewing angle.

Referring to FIG. 5 and FIG. 6, in an exemplary embodiment, the transmission assembly 400 includes a driving member 430, the mounting seat 500 is rotatably coupled to the second pushing member 420, and the driving member 430 is coupled to the driving mechanism 300. A cooperation between the driving member 430 and the first pushing member 410 enables the driving mechanism 300 to drive the second pushing member 420 to move the first pushing member 410 from the first position to the second position; and at the second position, a cooperation between the driving member 430 and the first pushing member 410 enables the driving mechanism 300 to drive the first pushing member 410 to move to the third position relative to the second pushing member 420, and between the second position and the third position, the first pushing member 410 drives the mounting seat 500 to rotate.

Figure 7:
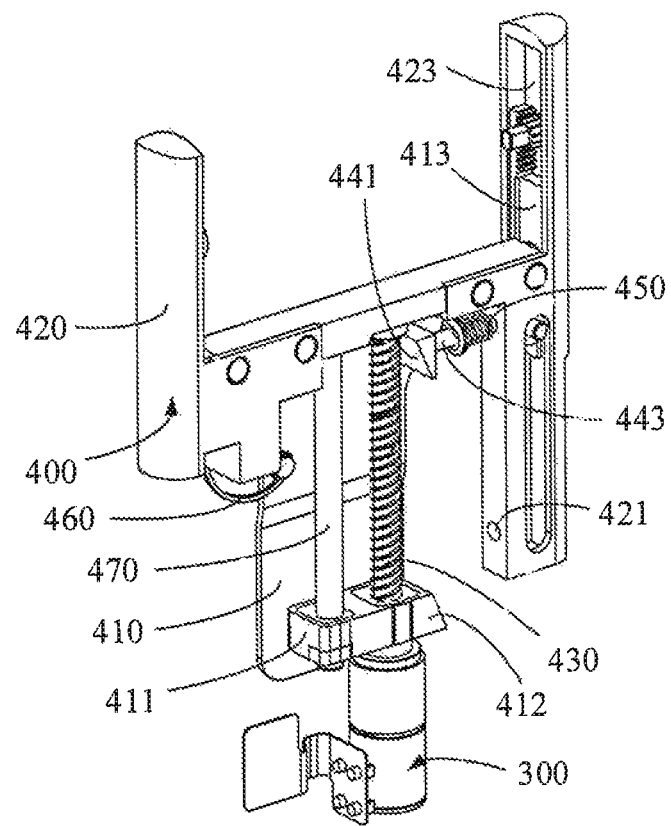
FIG. 7 is a solid diagram of a transmission mechanism of the mobile terminal shown in FIG. 1 from a viewing angle.
Figure 8:
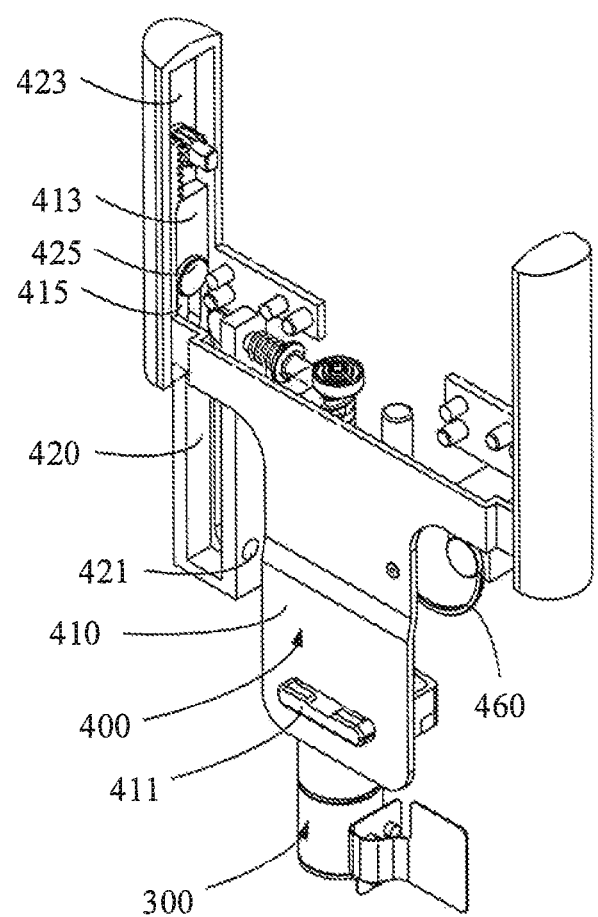
FIG. 8 is a solid diagram of the transmission mechanism of the mobile terminal shown in FIG. 7 from another viewing angle.

Referring to FIG. 7 and FIG. 8, in an exemplary embodiment, the driving mechanism 300 includes a motor, the motor may be a stepper motor, and the stepper motor is easy to control and relatively high in control accuracy. The driving member 430 includes a screw rod, the screw rod is long-strip, and the screw rod is provided with a spiral groove. The first pushing member 410 includes a first connecting portion 411 and a second connecting portion 413 coupled to the first connecting portion 411, and the first connecting portion 411 meshes with the screw rod.

In an exemplary embodiment, the first connecting portion 411 is arranged on the screw rod in a sleeving manner and forms meshing transmission with the screw rod. In other implementation modes, the first connecting portion 411 may be coupled to a rolling member of a roller structure, the rolling member is arranged in the spiral groove of the screw rod in a rolling manner, the driving mechanism 300 drives the screw rod to rotate, and then the screw rod drives the first connecting portion 411 to move along a length extension direction of the screw rod. It can be understood that a reduction box may be arranged between the motor and the screw rod to reduce starting impact of the motor. The second connecting portion 413 and the first connecting portion 411 may be formed integrally, and may also be connected detachably, and the second connecting portion 413 is movable relative to the second pushing member 420. A rack is arranged at an end portion of the second connecting portion 413, the mounting seat 500 is provided with gear teeth, and the rack meshes with the gear teeth.

Figure 9:
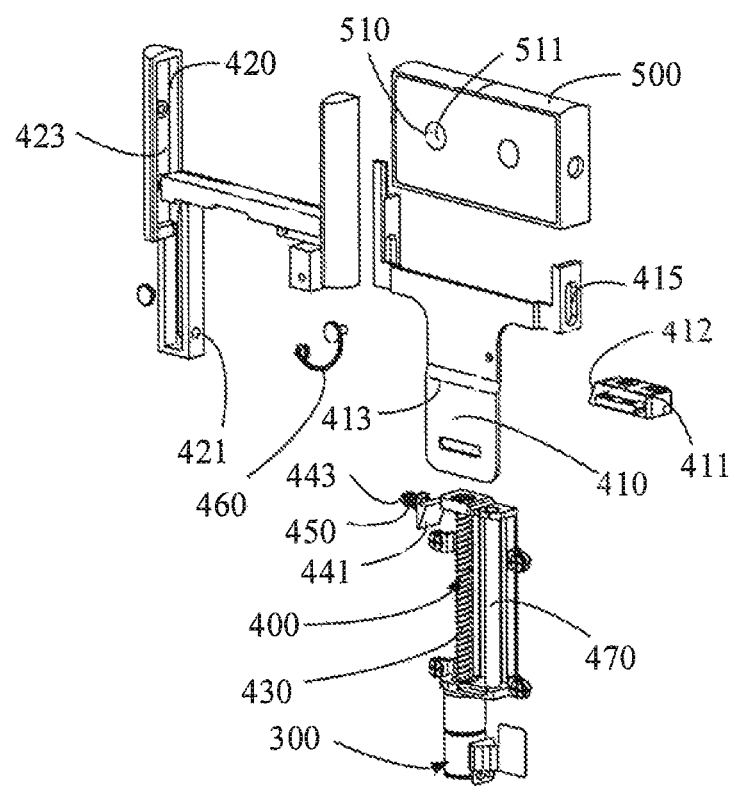
FIG. 9 is an exploded view of the transmission mechanism of the mobile terminal shown in FIG. 1 from a viewing angle.
Figure 10:
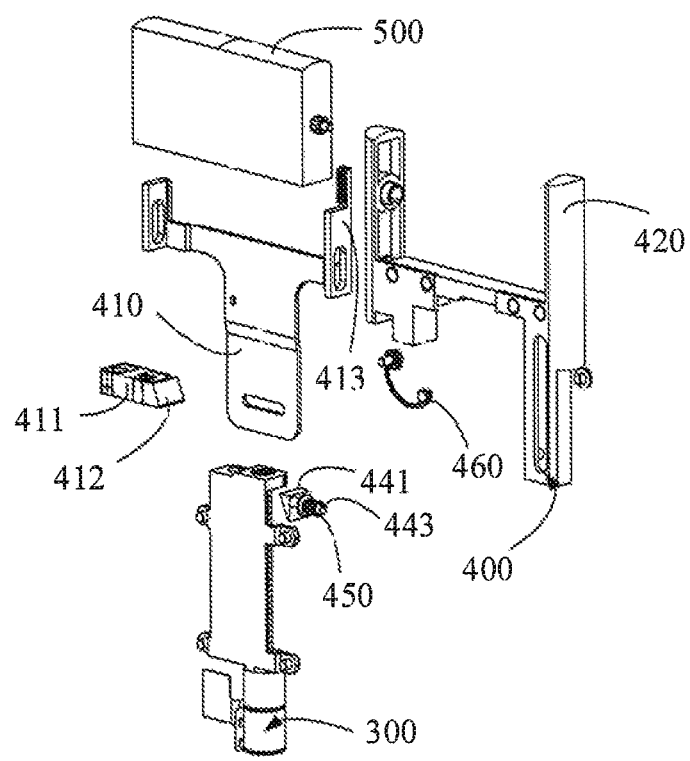
FIG. 10 is an exploded view of the transmission mechanism of the mobile terminal shown in FIG. 9 from another viewing angle.

In an exemplary embodiment, referring to FIG. 9 and FIG. 10, the first connecting portion 411 includes a first wedge block 412, and the second pushing member 420 is provided with a limiting hole 421. The transmission assembly 400 includes a second wedge block 441, a pin shaft 443 coupled to the second wedge block 441 and a first elastic member 450 coupled to the pin shaft 443, and the first elastic member 450 is coupled to the terminal device 100. Also referring to FIG. 4 and FIG. 7, at the second position, the first wedge block 412 abuts against the second wedge block 441, and between the second position and the third position, the first wedge block 412 is slidable along the second wedge block 441 and abuts against the second wedge block 441 to drive the second wedge block 441 to compress the first elastic member 450 and clamp the pin shaft 443 to the limiting hole 421. After the pin shaft 443 is clamped to the limiting hole 421, positions of the second pushing member 420 and the terminal device 100 are relatively fixed. The first pushing member 410 may be driven by the driving member 430 to continue moving to the third position. Between the second position and the third position, the driving mechanism 300 continues driving the second connecting portion 413 to slide relative to the second pushing member 420, so as to enable the rack to drive the mounting seat 500 to rotate via the gear teeth. In an exemplary embodiment, the first elastic member 450 is a spring, and the spring is arranged on the pin shaft 443 in the sleeving manner. In other implementation modes, the first elastic member 450 may be a structure such as a metal elastic piece, and the first elastic member 450 may also be made from an elastic silicone material or an elastic rubber material.

For example, the movement direction of the mounting seat 500 is a length direction of the mobile terminal 10. When the first pushing member 410 is at the first position, the motor is started. If the motor rotates forwards, the motor drives the screw rod to rotate, and the screw rod drives the first connecting portion 411 to move along the length extension direction of the screw rod. Since the rack of the second connecting portion 413 is clamped with the gear teeth of the mounting seat 500, the second pushing member 420 moves, together with the first pushing member 410, to the second position along the length extension direction of the screw rod. At the second position, the first wedge block 412 of the first connecting portion 411 abuts against the second wedge block 441, the limiting hole 421 of the second pushing member 420 moves to a position of the pin shaft 443, the first wedge block 412 pushes the second wedge block 441 to move along the width direction of the mobile terminal 10 and compress the first elastic member 450, and the pin shaft 443 enters the limiting hole 421 and is clamped into the limiting hole 421 to relatively fix the positions of the second pushing member 420 and the terminal device 100. At the second position, the mounting seat 500 completely exposes from the mounting groove 131. In a process that the first pushing member 410 moves from the second position to the third position, the first wedge block 412 keeps contacting with the second wedge block 441 and continues clamping the pin shaft 443 into the limiting hole 421, the first pushing member 410 moves along the length direction of the screw rod and slides relative to the second pushing member 420, the rack of the first pushing member 410 moves along the length direction of the mobile terminal 10 to drive the gear teeth on the mounting seat 500 to rotate, and the mounting seat 500 further rotates around the width direction of the mobile terminal 10, so as to change the orientation of the incident face 511. In a process that the first pushing member 410 moves from the second position to the third position, the camera module 510 may keep a communication connection with a processor in the mobile terminal 10, and then the camera module 510 may shoot at multiple angles in multiple scenarios, for example, panoramic shooting is implemented by the camera module 510, so that the convenience for use and the user experience are both improved.

Referring to FIG. 8, in an exemplary embodiment, the second pushing member 420 is provided with a sliding chute 423, and the sliding chute 423 extends along a movement direction of the mounting seat 500. The second connecting portion 413 is provided with a slide-way 415, a limiting column 425 is arranged in the sliding chute 423, and the limiting column 425 is fixedly coupled to the second pushing member 420. The limiting column 425 is arranged in the slide-way 415 in a penetration manner. A wall face of the slide way 415 abuts against the limiting column 425 to limit a relative sliding between the second connecting portion 413 and the second pushing member 420 in response to the first pushing member 410 moving from the third position to the second position. The first wedge block 412 separates from the second wedge block 441, the pin shaft 443 separates from the limiting hole 421, and the first connecting portion 411 drives the second pushing member 420 to move via the limiting column 425 in response to the first pushing member 410 moving from the second position to the first position.

Specifically, when the mounting seat 500 is at the third position, the motor is started, the motor rotates backwards, the motor drives the screw rod to rotate backwards, and the screw rod enables the first connecting portion 411 to move along the length extension direction of the screw rod. Since the pin shaft 443 is clamped into the limiting hole 421 to relatively fix the positions of the second pushing member 420 and the terminal device 100, the first pushing member 420 moves along the length direction of the screw rod and is slidable relative to the second pushing member 420 in the sliding chute 423 of the second pushing member 420 to drive the gear teeth on the mounting seat 500 to rotate, and the mounting seat 500 further rotates backwards around the width direction of the mobile terminal 10, so as to change the orientation of the incident face 511. When the first pushing member 410 moves to the second position, the wall face of the slide-way 415 abuts against the limiting column 425, the first wedge block 412 separates from the second wedge block 441, the pin shaft 443 separates from the limiting hole 421 under an action of the first elastic member 450, the screw rod continues driving the first pushing member 410 to move along the length direction of the mobile terminal 10, and then the first connecting portion 411 drives the second pushing member 420 to move to the first position via the limiting column 425, so as to accommodate the mounting seat 500 in the mounting groove 131. In a process that the first pushing member 410 moves from the third position to the second position, the camera module 510 may also keep the communication connection with the processor in the mobile terminal 10, and then the camera module 510 may shoot at multiple angles in multiple scenarios, for example, panoramic shooting is implemented by the camera module 510, so that the convenience for use and the user experience are both improved. It can be understood that a distance between the second position and the third position is designed such that the mounting seat 500, when the first pushing member 410 moves from the second position to the third position, may rotate 180 degrees to enable the camera module 510 to serve as a front/rear camera.

According to the mobile terminal 10, the first pushing member 410 moves relative to the terminal device 100 from the first position to the third position by the second position, the mounting groove 131 accommodates the camera module 510 at the first position, and the camera module 510 exposes from the mobile terminal 10 at the second position and the third position. By such a structure, a part of an area of the side where the display screen 200 of the mobile terminal 10 positioned is prevented from being occupied by the camera, and a screen-to-body ratio of the mobile terminal 10 is increased. For example, the screen-to-body ratio of the mobile terminal 10 adopting the structure may be over 85%. Between the second position and the third position, the driving mechanism 300 drives, by the transmission assembly 400, the mounting seat 500 to rotate to change the orientation of the incident face 511 of the camera module 510. By such arrangement, the camera module 510 may implement shooting at multiple angles in multiple scenarios, which is adoptable for improving convenience for use and improving the user experience.

Figure 11:
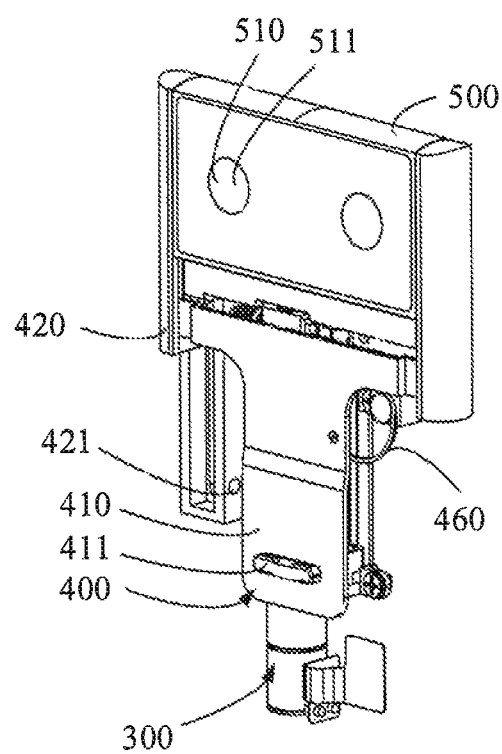
FIG. 11 is a solid diagram when the transmission mechanism of the mobile terminal shown in FIG. 7 is provided with a camera module from a viewing angle.
Figure 12:
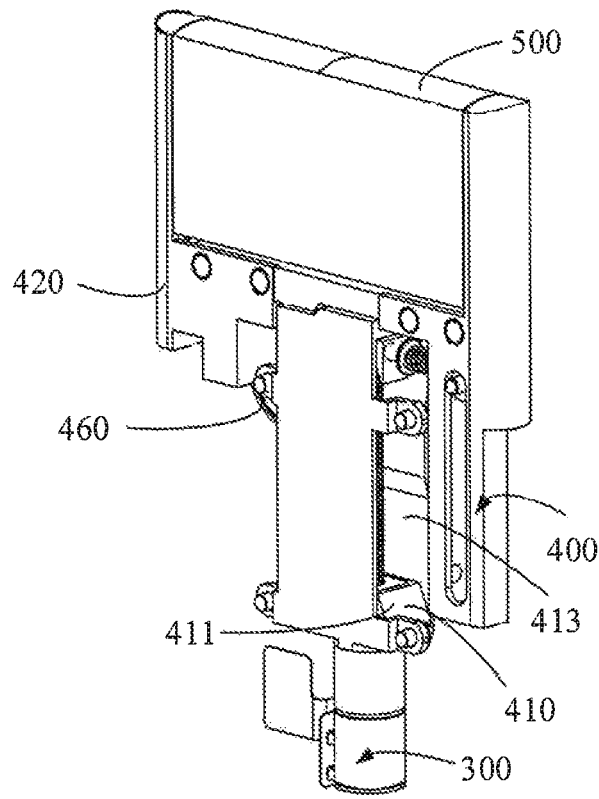
FIG. 12 is a solid diagram when the transmission mechanism of the mobile terminal shown in FIG. 11 is provided with the camera module from another viewing angle.

Referring to FIG. 11 and FIG. 12, in an exemplary embodiment, the transmission assembly 400 includes a second elastic member 460, the second elastic member 460 is of a torsion spring structure, and the second elastic member 460 connects the first pushing member 410 and the second pushing member 420. The first pushing member 410 compresses the second elastic member 460 in response to the first pushing member 410 moving from the second position to the third position, and when the first pushing member 410 reaches the third position, the second elastic member 460 is maximally deformed. The mounting seat 500 rotates, the second elastic member 460 keeps returning from deformation in response to the first pushing member 410 moving from the third position to the second position; and when the first pushing member 410 moves to the second position, the second elastic member 460 returns to an initial state and, in such case, the elasticity of the second elastic member 460 does not apply and the mounting seat 500 rotates till a stopping effect is achieved, so that a feedback is provided for the user.

Referring to FIG. 9, in an exemplary embodiment, the transmission assembly 400 includes a balancing rod 470, and a length extension direction of the balancing rod 470 is as same as the length extension direction of the screw rod. The balancing rod 470 is fixedly coupled to the terminal device 100, and the first connecting portion 411 is arranged in the balancing rod 470 in the penetration manner and slidable relative to the balancing rod 470. Arrangement of the balancing rod 470 is adoptable for stable sliding the first pushing member 410, so that movement stability of the mounting seat 500 is improved.

Another structural form may also be adopted for a cooperation between the driving member 430 and the first pushing member 410. As another implementation mode, the driving mechanism 300 includes the motor, and the motor is fixedly coupled to the terminal device 100. The driving member 430 includes a driving gear teeth, the first pushing member 410 includes the first connecting portion 411 and second connecting portion 413 coupled to the first connecting portion 411, the first connecting portion 411 is provided with a driving rack, and the driving rack extends along the movement direction of the mounting seat 500. The first connecting portion 411 meshes with the driving gear teeth, the second connecting portion 413 is arranged at the second pushing member 420 in a sliding manner, the second connecting portion 413 is provided with the rack, the mounting seat 500 is provided with the gear teeth, and the rack meshes with the gear teeth. By such a structure, the driving member 430 and the first pushing member 410 also implement movement of the first pushing member 410 from the first position to the third position through the second position and implement movement of the first pushing member 410 from the third position to the first position through the second position. Elaborations are omitted here.

Figure 13:
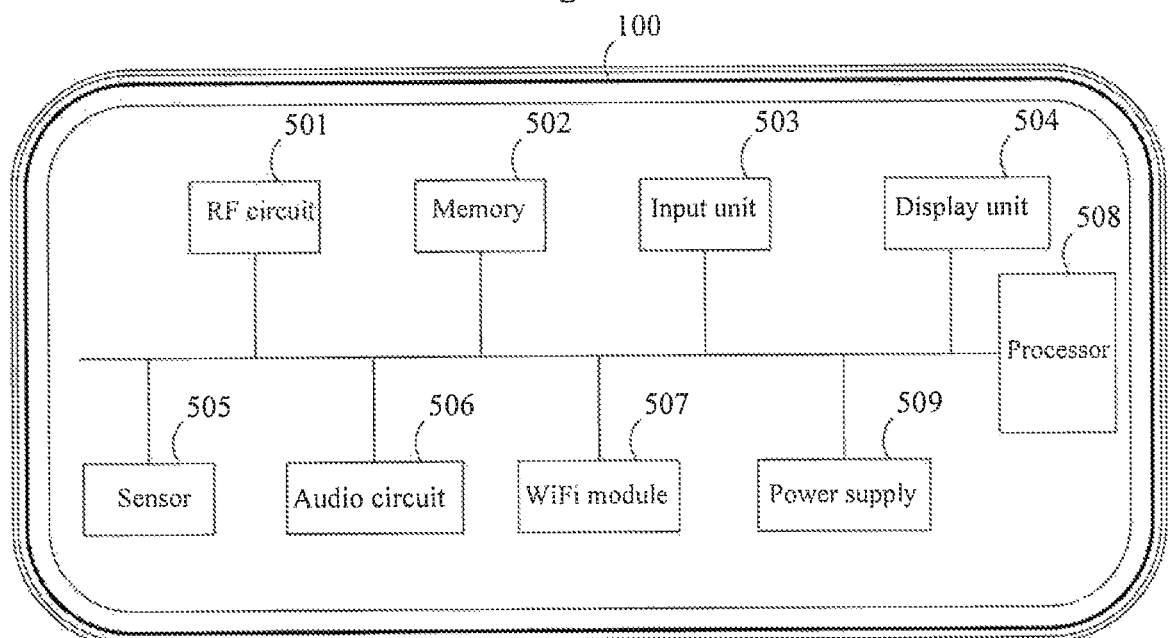
FIG. 13 is a structure diagram of a mobile terminal according to an embodiment of the present disclosure.

Referring to FIG. 13, FIG. 13 is a structure of a terminal device 100 according to an embodiment of the present disclosure. The terminal device 100 includes components such as a Radio Frequency (RF) circuit 501, a memory 502 including one or more than one computer-readable storage medium, an input unit 503, a display unit 504, a sensor 504, an audio circuit 506, a Wireless Fidelity (WiFi) module 507, a processor 508 including a plurality of processing cores and a power supply 509. Those skilled in the art should know that the structure of the terminal device 100 shown in FIG. 13 is not intended to limit the terminal device 100 and may include components more or fewer than those shown in the figure or some components are combined or different component arrangements are adopted.

The RF circuit 501 may be configured to receive and transmit information or receive and send a signal during a call, particularly, transmitting, after receiving downlink information of a base station, the downlink information to the plurality of processing cores of the processor 508 for processing and, in addition, sending involved uplink data to the base station. In an exemplary embodiment, the RF circuit 501 includes, but not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the RF circuit 501 may also communicate with a network and another device by wireless communication. Any communication standard or protocol is adopted for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) and the like.

The memory 502 may be configured to store an application program and data. The application program stored in the memory 502 includes an executable code. The application program may form various functional modules. The processor 508 runs the application program stored in the memory 502, thereby executing various functional applications and data processing. The memory 502 may include a program storage region and a data storage region. The program storage region may store an operating system, an application program required by at least one function (for example, a sound playing function and an image playing function) and the like. The data storage region may store data (for example, audio data and a phone book) created according to use of the terminal device 100 and the like. In an exemplary embodiment, the memory 502 may include a high-speed random access memory and may further include a nonvolatile memory, for example, at least one disk storage device, flash memory device or other volatile solid-state storage device. Correspondingly, the memory 502 may further include a memory controller for providing access to the memory 502 for the processor 508 and the input unit 503.

The input unit 503 is configured to receive input digital and character information or user characteristic information (for example, a fingerprint) and generate keyboard, mouse, joystick and optical trackball signal input related to user setting and function control. Specifically, in an exemplary embodiment, the input unit 503 may include a touch-sensitive face and other input devices. The touch-sensitive face, also called a touch display screen or a touch panel, may collect a touch operation of a user thereon or nearby (for example, an operation executed by the user with any proper object or accessory such as a finger and a stylus on the touch-sensitive face or nearby the touch-sensitive face) and drive a corresponding connection device according to a preset program. In an embodiment, the touch-sensitive face includes two parts, i.e., a touch detection device and a touch controller. The touch detection device detects a touch direction of the user, detects a signal generated by the touch operation and transmits the signal to the touch controller. The touch controller receives touch information from the touch detection device, converts it into a touch point coordinate and transmits it to the processor 508, and may receive and execute a command sent by the processor 508.

The display unit 504 is configured to display information input by the user or information provided for the user and various graphical user interfaces of the terminal device 100. These graphical user interfaces may be formed by graphics, texts, icons, videos and any combination thereof. The display unit 504 includes a display panel. Optionally, the display panel is configured in form of a Liquid Crystal Display (LCD) and an Organic Light-Emitting Diode (OLED). Furthermore, the touch-sensitive face is covered by the display panel. After detecting the touch operation thereon or nearby, the touch-sensitive face transmits it to the processor 508 to determine a type of a touch event. Then, the processor 508 provides corresponding visual output on the display panel according to the type of the touch event. In FIG. 13, the touch-sensitive face and the display panel realize input and output functions as two independent components. However, in some embodiments, the touch-sensitive face and the display panel may be integrated to realize the input and output functions. It can be understood that the display screen 200 may include the input unit 503 and the display unit 504.

The terminal device 100 may further include at least one sensor 505, for example, a light sensor, a motion sensor and another sensor. Specifically, the light sensor may include an ambient light sensor and a proximity sensor. The ambient light sensor may regulate brightness of the display panel according to brightness of ambient light, and the proximity sensor may turn off the display panel and/or backlight when the terminal device 100 is moved to an ear of a user. As a motion sensor, a gravitational acceleration sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the terminal device 100 will not be elaborated herein.

The audio circuit 506 may provide an audio interface between the user and the terminal device 100 by a loudspeaker and a microphone. The audio circuit 506 may convert received audio data into an electric signal for transmission to the speaker, and the speaker converts it into a sound signal for output. On the other hand, the microphone converts a collected sound signal into an electric signal, the audio circuit 506 receives and converts it into audio data, and the audio data is output to the processor 508 for processing and sent to, for example, another terminal device 100 by the RF circuit 501, or the audio data is output to the memory 502 for further processing. The audio circuit 506 may further include an earphone jack for providing communication between an external earphone and the terminal device 100.

WiFi relates to a short-distance wireless transmission technology. The terminal device 100 may help the user receive and send an electronic mail, browse a webpage, access streaming media and the like through the WiFi module 507, and wireless wideband Internet access is provided for the user. Although the WiFi module 507 is shown in FIG. 13, it can be understood that it is not a necessary composition of the terminal device 100 and may completely be omitted according to a requirement without changing the scope of the essence of the invention.

The processor 508 is a control center of the terminal device 100 and connects each part of the terminal device 100 by use of various interfaces and lines and executes various functions and data processing of the terminal device 100 by running or executing the application program stored in the memory 502 and calling data stored in the memory 502, thereby monitoring the whole terminal device 100. Optionally, the processor 508 may include a plurality of processing cores. In an exemplary embodiment, the processor 508 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 508.

The terminal device 100 further includes a power supply 509 supplying power to each component. In an exemplary embodiment, the power supply 509 may be logically connected with the processor 508 by a power management system, thereby realizing functions of charging and discharging management, power consumption management and the like by the power management system. The power supply 509 may further include one or more than one direct current or alternating current power supply, rechargeable system, power failure detection circuit, power converter or inverter and power state indicator and any other component.

Although not shown in FIG. 13, the terminal device 100 may further include a Bluetooth module and the like, which will not be elaborated herein. During specific implementation, each of the modules may be implemented as an independent entity, and may also be freely combined for implementation as the same or a plurality of entities. Specific implementation of each of the modules may refer to the method embodiment and will not be elaborated here.

Each technical characteristic of the embodiments may be freely combined. For brief description, not all possible combinations of each technical characteristic in the embodiments are described, but all the combinations of these technical characteristics shall fall within the scope recorded in the specification without conflicts.

The embodiments only express some implementation modes of the disclosure, and relatively specific and detailed descriptions are made thereto but should not thus be understood as limits to the scope of the patent disclosure. It is to be pointed out that those of ordinary skill in the art may further make a plurality of transformations and improvements without departing from the concept of the disclosure and all of them fall within the scope of protection of the disclosure. Therefore, the scope of protection of the patent disclosure shall be subject to the appended claims.

What is claimed is:

1. A mobile terminal, comprising:
a terminal device comprising a front face, a rear face opposite the front face, and a side peripheral face coupled between the front face and the rear face, wherein the terminal device defines a mounting groove through the side peripheral face;
a driving mechanism coupled to the terminal device;
a transmission assembly comprising a first pushing member and a second pushing member coupled to the first pushing member, wherein the first pushing member is coupled to the driving mechanism; and
a mounting seat coupled to the first pushing member and the second pushing member, wherein the mounting seat is provided with a camera module; the driving mechanism enables the first pushing member to move from a first position to a third position via a second position; at the first position, the mounting groove accommodates the camera module; at the second position and the third position, the camera module exposes from the terminal device; between the first position and the second position, the first pushing member enables the second pushing member and the mounting seat to move; between the second position and the third position, the driving mechanism enables the first pushing mechanism to move relative to the second pushing member, and the first pushing member enables the mounting seat to rotate to change an orientation of an incident face of the camera module.

2. The mobile terminal of claim 1, wherein a rotating axis of the mounting seat is perpendicular to a movement direction of the first pushing member.

3. The mobile terminal of claim 1, wherein the transmission assembly comprises a driving member, the mounting seat is rotatably coupled to the second pushing member, and the driving member is coupled to the driving mechanism; a cooperation between the driving member and the first pushing member enables the driving mechanism to drive the second pushing member and the mounting seat to move the first pushing mechanism from the first position to the second position, and at the second position, a cooperation between the driving member and the first pushing member enables the driving mechanism to drive the first pushing member to move to the third position relative to the second pushing member, and between the second position and the third position, the first pushing member drives the mounting seat to rotate.

4. The mobile terminal of claim 3, wherein the driving mechanism comprises a motor, the driving member comprises a screw rod, the first pushing member comprises a first connecting portion and a second connecting portion coupled to the first connecting portion, and the first connecting portion meshes with the screw rod; the second connecting portion is movable relative to the second pushing member, the second connecting portion is provided with a rack, the mounting seat is provided with gear teeth, and the rack meshes with the gear teeth.

5. The mobile terminal of claim 4, wherein the first connecting portion comprises a first wedge block, and the second pushing member is provided with a limiting hole; the transmission assembly comprises a second wedge block, a pin shaft coupled to the second wedge block, a first elastic member coupled to the pin shaft, and the first elastic member is coupled to the terminal device; at the second position, the first wedge block abuts against the second wedge block, and between the second position and the third position, the first wedge block is slidable along the second wedge block and abuts against the second wedge block to drive the second wedge block to compress the first elastic member and clamp the pin shaft to the limiting hole; between the second position and the third position, the driving mechanism enables the second connecting portion to slide relative to the second pushing member, so as to enable the rack to drive the mounting seat to rotate via the gear teeth.

6. The mobile terminal of claim 5, wherein the second pushing member is provided with a sliding chute, and the second connecting portion is provided with a slide-way; a limiting column is arranged in the sliding chute, and the limiting column is arranged in the sliding chute in a penetration manner; a wall face of the slide-way abuts against the limiting column to limit a relative sliding between the second connecting portion and the second pushing member in response to the first pushing member moving from the third position to the second position; the first wedge block separates from the second wedge block, the pin shaft separates from the limiting hole, and the first connecting portion drives the second pushing member to move via the limiting column in response to the first pushing member moving from the second position to the first position.

7. The mobile terminal of claim 4, wherein the transmission assembly comprises a balancing rod, the balancing rod is fixedly coupled to the terminal device, and the first connecting portion is arranged in the balancing rod in a penetration manner and is slidable relative to the balancing rod.

8. The mobile terminal of claim 1, wherein the transmission assembly comprises a second elastic member, the second elastic member is coupled to the first pushing member and the second pushing member; the first pushing member compresses the second elastic member in response to the first pushing member moving from the second position to the third position.

9. The mobile terminal of claim 1, comprising a display screen, wherein a display region of the display screen faces the front face; at the second position, the orientation of the incident face is opposite an orientation of the display screen, and at the third position, the orientation of the incident face is as same as the orientation of the display screen.

10. The mobile terminal of claim 1, comprising the display screen, wherein a display region of the display screen faces the front face; and at the second position, the orientation of the incident face is as same as an orientation of the display screen, and at the third position, the orientation of the incident face is opposite the orientation of the display screen.

11. A transmission module, comprising a mounting seat, a driving member, a first pushing member and a second pushing member, wherein the first pushing member and the second pushing member are correspondingly coupled to the mounting seat; a cooperation between the driving member and the first pushing member enables the second pushing member to move and drive the first pushing member to move from a first position to a third position via a second position; between the first position and the second position, the first pushing member enables the second pushing member and the mounting seat to move; between the second position and the third position, the first pushing member moves relative to the second pushing member and enables the mounting seat to rotate; a rotating axis of the mounting seat is perpendicular to a movement direction of the first pushing member.

12. The transmission module of claim 11, wherein the driving mechanism comprises a motor, the driving member comprises a screw rod, the first pushing member comprises a first connecting portion and a second connecting portion coupled to the first connecting portion, and the first connecting portion meshes with the screw rod; the second connecting portion is arranged at the second pushing member in a sliding manner, the second connecting portion is provided with a rack, the mounting seat is provided with gear teeth, and the rack meshes with the gear teeth.

13. The transmission module of claim 12, wherein the first connecting portion comprises a first wedge block, and the second pushing member is provided with a limiting hole; the transmission module comprises a second wedge block, a pin shaft coupled to the second wedge block and a first elastic member coupled to the pin shaft; at the second position, the first wedge block abuts against the second wedge block, and between the second position and the third position, the first wedge block is slidable along the second wedge block and abuts against the second wedge block, so as to drive the second wedge block to compress the first elastic member and clamp the pin shaft to the limiting hole; between the second position and the third position, the second connecting portion is slidable relative to the second pushing member to enable the rack to drive the mounting seat to rotate via the gear teeth.

14. The transmission module of claim 13, wherein the second pushing member is provided with a sliding chute, and the second connecting portion is provided with a slide-way; a limiting column is arranged in the sliding chute, and the limiting column is arranged in the sliding chute in a penetration manner; a wall face of the slide-way abuts against the limiting column, so as to limit a relative sliding between the second connecting portion and the second pushing member in response to the first pushing member moving from the third position to the second position; the first wedge block separates from the second wedge block, the pin shaft separates from the limiting hole, and the first connecting portion drives the second pushing member to move via the limiting column in response to the first pushing member moving from the second position to the first position.

15. The transmission module of claim 11, wherein a rotating axis of the mounting seat is perpendicular to a movement direction of the first pushing member.

16. A transmission mechanism, comprising a motor and the transmission module, wherein the transmission module comprises a mounting seat, a driving member, a first pushing member and a second pushing member; the first pushing member and the second pushing member are correspondingly coupled to the mounting seat; a cooperation between the driving member and the first pushing member enables the second pushing member to move and drive the first pushing member to move from a first position to a third position via a second position; between the first position and the second position, the first pushing member enables the second pushing member and the mounting seat to move; between the second position and the third position, the first pushing member is movable relative to the second pushing member and enables the mounting seat to rotate; a rotating axis of the mounting seat is perpendicular to a movement direction of the first pushing member;
an output end of the motor is coupled to the driving member, and the motor enables the driving member to rotate.

17. The transmission mechanism of claim 16, wherein the camera module is mounted at the mounting seat; between the second position and the third position, the first driving member drives the mounting seat to rotate to change an orientation of an incident face of the camera module.

18. The transmission mechanism of claim 17, wherein the driving mechanism comprises a motor, the driving member comprises a screw rod, the first pushing member comprises a first connecting portion and a second connecting portion coupled to the first connecting portion, and the first connecting portion meshes with the screw rod; the second connecting portion is arranged at the second pushing member in a sliding manner, the second connecting portion is provided with a rack, the mounting seat is provided with gear teeth, and the rack meshes with the gear teeth.

19. The transmission mechanism of claim 18, wherein the first connecting portion comprises a first wedge block, and the second pushing member is provided with a limiting hole; the transmission module comprises a second wedge block, a pin shaft coupled to the second wedge block and a first elastic member coupled to the pin shaft; at the second position, the first wedge block abuts against the second wedge block, and between the second position and the third position, the first wedge block is slidable along the second wedge block and abuts against the second wedge block, so as to drive the second wedge block to compress the first elastic member and clamp the pin shaft to the limiting hole; between the second position and the third position, the second connecting portion is slidable relative to the second pushing member to enable the rack to drive the mounting seat to rotate via the gear teeth.

20. The transmission mechanism of claim 19, wherein the second pushing member is provided with a sliding chute, and the second connecting portion is provided with a slide-way; a limiting column is arranged in the sliding chute, and the limiting column is arranged in the sliding chute in a penetration manner; a wall face of the slide-way abuts against the limiting column, so as to limit a relative sliding between the second connecting portion and the second pushing member in response to the first pushing member moving from the third position to the second position; the first wedge block separates from the second wedge block, the pin shaft separates from the limiting hole, and the first connecting portion drives the second pushing member to move via the limiting column in response to the first pushing member moving from the second position to the first position.

* * * * *